US007653631B1

(12) United States Patent
Lundberg

(10) Patent No.: US 7,653,631 B1
(45) Date of Patent: Jan. 26, 2010

(54) METHOD FOR SYNCHRONIZING INFORMATION IN MULTIPLE CASE MANAGEMENT SYSTEMS

(75) Inventor: Steven W. Lundberg, Edina, MN (US)

(73) Assignee: FoundationIP, LLC, Minneapolis, MN (US)

( * ) Notice: Subject to any disclaimer, the term of this patent is extended or adjusted under 35 U.S.C. 154(b) by 530 days.

(21) Appl. No.: 10/143,506

(22) Filed: May 10, 2002

Related U.S. Application Data

(60) Provisional application No. 60/289,928, filed on May 10, 2001.

(51) Int. Cl.
*G06F 17/30* (2006.01)
(52) U.S. Cl. .................... 707/10; 707/100; 707/200; 707/201; 705/1; 705/10
(58) Field of Classification Search ............ 707/10, 707/202, 1, 2, 100, 200, 201; 709/204, 217; 705/1, 10
See application file for complete search history.

(56) References Cited

U.S. PATENT DOCUMENTS

| 5,175,681 | A |   | 12/1992 | Iwai et al. ............ 364/400 |
| 5,329,447 | A |   | 7/1994  | Leedom, Jr. |
| 5,423,043 | A |   | 6/1995  | Fitzpatrick et al. |
| 5,740,245 | A | * | 4/1998  | Bennett et al. .......... 715/530 |
| 5,758,354 | A | * | 5/1998  | Huang et al. ............ 707/201 |
| 5,819,269 | A |   | 10/1998 | Uomini ................... 707/7 |
| 5,867,579 | A |   | 2/1999  | Saito ..................... 380/25 |
| 5,875,431 | A |   | 2/1999  | Heckman et al. |
| 5,884,256 | A | * | 3/1999  | Bennett et al. .......... 715/512 |
| 5,923,845 | A |   | 7/1999  | Kamiya et al. ....... 395/200.36 |
| 5,923,848 | A |   | 7/1999  | Goodhand et al. |
| 5,987,464 | A | * | 11/1999 | Schneider ............... 707/10 |
| 6,057,841 | A |   | 5/2000  | Thurlow et al. .......... 345/347 |
| 6,128,730 | A |   | 10/2000 | Levine .................... 713/1 |
| 6,135,646 | A |   | 10/2000 | Kahn et al. ............ 395/200.47 |
| 6,161,149 | A |   | 12/2000 | Achacoso et al. |
| 6,237,040 | B1 |  | 5/2001  | Tada |
| 6,249,807 | B1 |  | 6/2001  | Shaw et al. |
| 6,250,930 | B1 |  | 6/2001  | Mintz |
| 6,252,963 | B1 |  | 6/2001  | Rhoads ................... 380/54 |
| 6,256,676 | B1 |  | 7/2001  | Taylor et al. ............ 709/246 |
| 6,287,411 | B1 |  | 9/2001  | Kelley et al. |

(Continued)

FOREIGN PATENT DOCUMENTS

WO    WO-01/24035    4/2001

(Continued)

OTHER PUBLICATIONS

"Adoption of Court technology in the Texas trial Courts " —J.C. Domino—Journal System Journal—1997—HeinOnline—(The Justice System Journal, vol. 19, No. 3 1997; (pp. 245-259).*

(Continued)

*Primary Examiner*—Jean B. Fleurantin
*Assistant Examiner*—Anh Ly
(74) *Attorney, Agent, or Firm*—Kendal M. Sheets

(57) ABSTRACT

The present invention includes a method for synchronizing information between and among multiple electronic case management systems. The method includes sending an updated data packet from one case management system to another case management system. The data from the packet is used to update status data.

8 Claims, 2 Drawing Sheets

U.S. PATENT DOCUMENTS

| | | | |
|---|---|---|---|
| 6,295,541 B1* | 9/2001 | Bodnar et al. | 707/203 |
| 6,324,544 B1* | 11/2001 | Alam et al. | 707/201 |
| 6,327,594 B1 | 12/2001 | Van Huben et al. | 707/200 |
| 6,330,589 B1 | 12/2001 | Kennedy | 709/206 |
| 6,339,767 B1 | 1/2002 | Rivette et al. | |
| 6,369,840 B1 | 4/2002 | Barnett et al. | |
| 6,374,246 B1 | 4/2002 | Matsuo | 707/10 |
| 6,374,252 B1 | 4/2002 | Althoff et al. | 707/102 |
| 6,389,423 B1* | 5/2002 | Sakakura | 707/10 |
| 6,401,104 B1* | 6/2002 | LaRue et al. | 707/203 |
| 6,401,112 B1* | 6/2002 | Boyer et al. | 707/201 |
| 6,470,358 B1* | 10/2002 | Beyda et al. | 707/201 |
| 6,499,021 B1 | 12/2002 | Abu-Hakima | |
| 6,549,612 B2 | 4/2003 | Gifford et al. | |
| 6,549,884 B1* | 4/2003 | Laroche et al. | 704/207 |
| 6,549,894 B1* | 4/2003 | Simpson et al. | 707/1 |
| 6,556,992 B1 | 4/2003 | Barney et al. | |
| 6,571,290 B2 | 5/2003 | Selgas et al. | |
| 6,574,617 B1 | 6/2003 | Immerman et al. | 707/1 |
| 6,606,485 B1 | 8/2003 | Chen et al. | |
| 6,636,867 B2 | 10/2003 | Robertson | |
| 6,640,213 B1* | 10/2003 | Carp et al. | 705/10 |
| 6,662,178 B2 | 12/2003 | Lee | |
| 6,694,315 B1* | 2/2004 | Grow | 707/10 |
| 6,721,747 B2 | 4/2004 | Lipkin | |
| 6,766,307 B1 | 7/2004 | Israel et al. | |
| 6,792,436 B1* | 9/2004 | Zhu et al. | 707/201 |
| 6,839,707 B2* | 1/2005 | Lee et al. | 707/8 |
| 6,839,738 B2 | 1/2005 | Quine et al. | |
| 6,912,582 B2 | 6/2005 | Guo et al. | |
| 6,983,308 B1* | 1/2006 | Oberhaus et al. | 709/206 |
| 7,007,068 B2 | 2/2006 | Morkel | |
| 7,010,144 B1 | 3/2006 | Davis et al. | |
| 7,069,592 B2* | 6/2006 | Porcari | 715/530 |
| 7,076,439 B1* | 7/2006 | Jaggi | 705/9 |
| 7,085,755 B2 | 8/2006 | Bluhm et al. | |
| 2001/0001864 A1 | 5/2001 | Page et al. | |
| 2001/0034669 A1 | 10/2001 | Tropper | |
| 2001/0037460 A1* | 11/2001 | Porcari | 713/201 |
| 2001/0049617 A1 | 12/2001 | Berenson et al. | |
| 2001/0049707 A1 | 12/2001 | Tran | |
| 2002/0027901 A1 | 3/2002 | Liu et al. | |
| 2002/0032738 A1 | 3/2002 | Foulger et al. | |
| 2002/0052769 A1 | 5/2002 | Navani et al. | 705/7 |
| 2002/0059075 A1* | 5/2002 | Schick et al. | 705/1 |
| 2002/0059076 A1* | 5/2002 | Grainger et al. | 705/1 |
| 2002/0059256 A1* | 5/2002 | Halim et al. | 707/10 |
| 2002/0065675 A1 | 5/2002 | Grainger et al. | |
| 2002/0065676 A1 | 5/2002 | Grainger et al. | |
| 2002/0065677 A1* | 5/2002 | Grainger et al. | 705/1 |
| 2002/0069212 A1* | 6/2002 | Leonardos | 707/200 |
| 2002/0072920 A1 | 6/2002 | Grainger | |
| 2002/0078243 A1* | 6/2002 | Rich et al. | 709/248 |
| 2002/0078255 A1 | 6/2002 | Narayan | 709/316 |
| 2002/0083093 A1 | 6/2002 | Goodisman et al. | |
| 2002/0087600 A1 | 7/2002 | Newbold | 707/514 |
| 2002/0087639 A1* | 7/2002 | Quine et al. | 709/206 |
| 2002/0095399 A1* | 7/2002 | Devine et al. | 707/1 |
| 2002/0099711 A1* | 7/2002 | Robertson | 707/100 |
| 2002/0099775 A1* | 7/2002 | Gupta et al. | 709/205 |
| 2002/0111824 A1 | 8/2002 | Grainger | |
| 2002/0111953 A1* | 8/2002 | Snyder | 707/101 |
| 2002/0116363 A1* | 8/2002 | Grainger | 707/1 |
| 2002/0116467 A1* | 8/2002 | Boyer et al. | 709/206 |
| 2002/0124070 A1* | 9/2002 | Pulsipher | 709/223 |
| 2002/0133508 A1* | 9/2002 | LaRue et al. | 707/202 |
| 2002/0138465 A1 | 9/2002 | Lee et al. | |
| 2002/0161733 A1* | 10/2002 | Grainger | 705/1 |
| 2002/0178229 A1* | 11/2002 | Sinha et al. | 709/206 |
| 2002/0186240 A1 | 12/2002 | Eisenberger et al. | |
| 2003/0009345 A1* | 1/2003 | Thorpe | 705/1 |
| 2003/0009521 A1* | 1/2003 | Cragun | 709/205 |
| 2003/0055828 A1* | 3/2003 | Koch et al. | 707/10 |
| 2003/0088473 A1* | 5/2003 | Fisher et al. | 705/26 |
| 2003/0163492 A1 | 8/2003 | Slifer | |
| 2003/0187938 A1* | 10/2003 | Mousseau et al. | 709/206 |
| 2003/0220891 A1 | 11/2003 | Fish | |
| 2004/0024634 A1* | 2/2004 | Carp et al. | 705/10 |
| 2004/0049482 A1* | 3/2004 | Brechter et al. | 707/1 |
| 2004/0054711 A1* | 3/2004 | Multer | 709/201 |
| 2004/0205537 A1 | 10/2004 | Graham et al. | |
| 2004/0236775 A1* | 11/2004 | Leonardos | 707/100 |
| 2005/0044078 A1* | 2/2005 | deVries et al. | 707/9 |
| 2005/0099963 A1* | 5/2005 | Multer et al. | 370/254 |
| 2005/0125459 A1* | 6/2005 | Sutinen et al. | 707/201 |
| 2005/0246194 A1 | 11/2005 | Lundberg | |

FOREIGN PATENT DOCUMENTS

| | | |
|---|---|---|
| WO | WO-01/93081 | 12/2001 |
| WO | WO-02/37304 | 5/2002 |

OTHER PUBLICATIONS

"History, State and future of User Interface management Systems"—Jonas Lowgren—ACM SIGCHI Bulletin, vol. 20, Issue 1 (Jul. 1998) (pp. 32-44).*

"Open Texture and Ontologies in legal Information Systems"—Bench-Capon T. J. M. and Visser P. R.S.—Proceedings, 8$^{th}$ International workshop, database and Expert Systems Applications—Sep. 1-2, 1997 (pp. 192-197).*

Anonymous, "Smartmail Knowledge-Based System for the Officevision Desktop", *IBM Technical Disclosure Bulletin*, 33, (Nov. 1, 1990),1 p.

"CPI News", *Computer Packages, Inc.*, (Fall, 2001), 4 pages.

"Memotech IP Suite", http://www.cpajersey.com/cpajersey/mis2.htm, [retrieved on Sep. 24, 2002], Computer Patent Annuities (CPA) LP, 3 pages.

"Renewal Services", http://www.cpajersey.com/cpajersey/patent1.htm, [retrieved on Sep. 24, 2002], Computer Patent Annuities (CPA) LP, 5 pages.

Schwegman, M. L., et al., "Using The Internet To Support Your Practice In Minnesota", *Lorman Education Services*, Eau Claire, WI, (Nov. 30, 2000), 82 pages.

"U.S. Appl. No. 09/872,701 Advisory Action mailed Aug. 29, 2006", 3 pgs.

"U.S. Appl. No. 09/872,701 Final Office Action mailed Mar. 30, 2005", 9 pgs.

"U.S. Appl. No. 09/872,701 Final Office Action mailed Jun. 15, 2006", 11 pgs.

"U.S. Appl. No. 09/872,701 Final Office Action mailed Dec. 8, 2003", 6 pgs.

"U.S. Appl. No. 09/872,701 Non Final Office Action mailed Aug. 5, 2003", 8 pgs.

"U.S. Appl. No. 09/872,701 Non Final Office Action mailed Aug. 10, 2007", 13 pgs.

"U.S. Appl. No. 09/872,701 Non Final Office Action mailed Oct. 25, 2005", 9 pgs.

"U.S. Appl. No. 09/872,701 Non-Final Office Action mailed Jun. 28, 2004", 8 pgs.

"U.S. Appl. No. 09/872,701 Response filed Feb. 9, 2004 to Final Office Action mailed Dec. 8, 2003", 15 pgs.

"U.S. Appl. No. 09/872,701 Response filed Mar. 27, 2006 to Non Final Office Action mailed Oct. 25, 2005", 16 pgs.

"U.S. Appl. No. 09/872,701 Response filed Aug. 15, 2006 to Final Office Action mailed Jun. 15, 2006", 17 pgs.

"U.S. Appl. No. 09/872,701 Response filed Aug. 30, 2005 to Final Office Action mailed Mar. 30, 2005", 16 pgs.

"U.S. Appl. No. 09/872,701 Response filed Sep. 28, 2004 to Non Final Office Action Jun. 28, 2004", 16 pgs.

"U.S. Appl. No. 09/872,701 Response filed Nov. 5, 2003 to Non Final Office Action mailed Aug. 5, 2003", 17 pgs.

"U.S. Appl. No. 10/087,561 Final Office Action mailed Oct. 27, 2006", 13 pgs.

"U.S. Appl. No. 10/087,561 Non Final Office Action mailed Apr. 13, 2006", 14 pgs.

"U.S. Appl. No. 10/087,561 Non Final Office Action mailed May 7, 2007", 15 pgs.

"U.S. Appl. No. 10/087,561 Response filed Mar. 20, 2007 to Final Office Action mailed Oct. 27, 2006", 18 pgs.

"U.S. Appl. No. 10/087,561 Response filed Aug. 11, 2006 to Non Final Office Action mailed Apr. 13, 2006", 16 pgs.

"U.S. Appl. No. 10/087,561 Response to Non-Final Office Action filed Oct. 8, 2007", 14 pgs.

"U.S. Appl. No. 10/128,141 Appeal Brief filed Feb. 21, 2007", 23 pgs.

"U.S. Appl. No. 10/128,141 Decision from Pre-Appeal Brief Review mailed Dec. 21, 2006", 2 pgs.

"U.S. Appl. No. 10/128,141 Final Office Action mailed Aug. 23, 2006", 14 pgs.

"U.S. Appl. No. 10/128,141 Final Office Action mailed Dec. 22, 2005", 13 pgs.

"U.S. Appl. No. 10/128,141 Non Final Office Action mailed Mar. 8, 2006", 19 pgs.

"U.S. Appl. No. 10/128,141 Non Final Office Action mailed Jul. 14, 2005", 17 pgs.

"U.S. Appl. No. 10/128,141 Pre-Appeal Brief Request for Review filed Oct. 23, 2006", 4 pgs.

"U.S. Appl. No. 10/128,141 Response to Final Office Action filed Feb. 22, 2006", 9 pgs.

"U.S. Appl. No. 10/128,141 Response to Non Final Office Action filed Jun. 8, 2006", 11 pgs.

"U.S. Appl. No. 10/128,141 Response to Non Final Office Action filed Oct. 14, 2005", 12 pgs.

"International Application No. PCT/US02/12811 International Preliminary Examination Report mailed Oct. 6, 2003", 9 pgs.

"International Application No. PCT/US02/12811 International Search Report mailed Sep. 5, 2002", 6 pgs.

"International Application No. PCT/US02/12811 Response to Written Opinion filed Apr. 7, 2003", 9 pgs.

"International Application No. PCT/US02/12811 Written Opinion mailed Feb. 10, 2003", 4 pgs.

"Non-Final Office Action Mailed Aug. 10, 2007 in U.S. Appl. No. 09/872,701", OARN, 12 pgs.

* cited by examiner

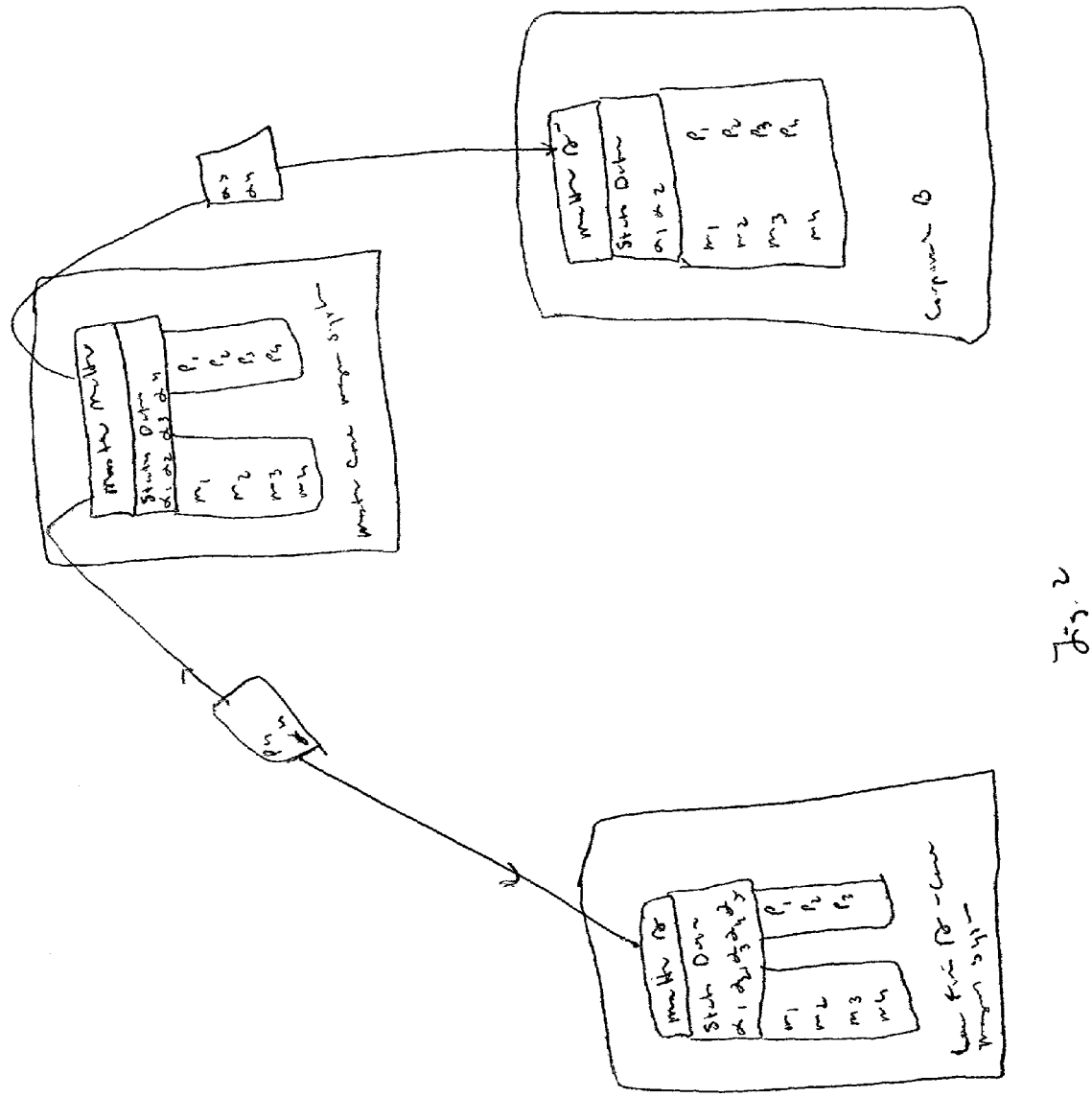

METHOD FOR SYNCHRONIZING INFORMATION IN MULTIPLE CASE MANAGEMENT SYSTEMS

RELATED APPLICATIONS

This application claims the benefit of priority to U.S. Provisional Patent Application Ser. No. 60/289,928, filed May 10, 2001, the entirety of which is incorporated herein by reference.

This application claims the benefit of priority to U.S. patent application Ser. No. 09/872,701, filed Jun. 1, 2001, which claims priority to U.S. Provisional Patent Application Ser. No. 60/280,386, filed Mar. 29, 2001, each of which are incorporated herein by reference in their entirety.

This application claims the benefit of priority to U.S. patent application Ser. No. 10/087,561, filed Mar. 1, 2002, the entirety of which is incorporated herein by reference.

This application claims the benefit of priority to U.S. patent application Ser. No. 10/128,141, entitled "Methods, Systems, and E-Mails to Matters and Organizations," filed Apr. 23, 2002, which claims priority to U.S. Provisional Patent Application Ser. No. 60/285,842, filed Apr. 23, 2001, and to U.S. Provisional Patent Application Ser. No. 60/335,732, filed Oct. 18, 2001, each of which are incorporated herein by reference in their entirety.

BACKGROUND OF THE INVENTION

The present invention relates to a method and to a system for synchronizing information in matters that are organized in multiple case management systems.

Electronic case management systems for legal practices have been developed over the past few years and continue to be developed. The electronic case management systems are typically software systems that are hosted on servers within a particular facility and are owned by corporate customers or law firm customers. Some case management systems are hosted by application service providers, ASP's. It is possible for the same case management software architecture to be discretely hosted among a number of law firms and companies and to exist as an ASP, accepting matters one by one. Legal matters directed to the same subject are re-created and populated with information within a law firm's case management system, a corporation's case management system, and, in some instances, an ASP. The problem with this disparate type of usage is that there is no easy way for users of substantially identical software architecture to communicate with each other. Without an ability to communicate, users of substantially identical systems cannot synchronize their information and cannot effectively communicate with each other.

DESCRIPTION OF DRAWINGS

FIG. 2 is a schematic view of another embodiment of the synchronizing method of the present invention.

SUMMARY OF THE INVENTION

Figure 1:
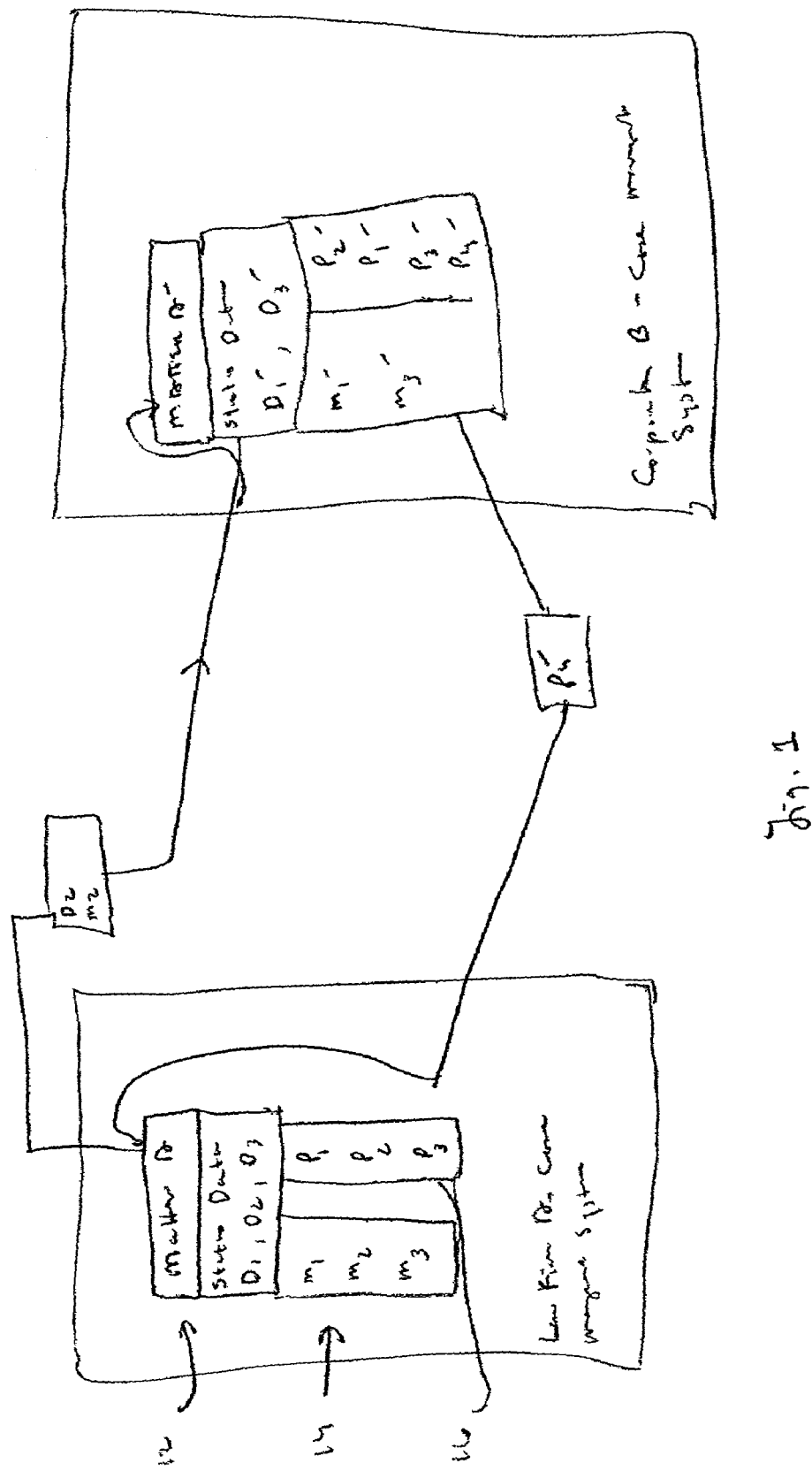
FIG. 1 is a schematic view of one embodiment of the synchronizing method of the present invention.

In one method embodiment, the present invention includes an information synchronization method. The method includes providing at least first and second case management systems. Each system includes a data storage component for storing status data, a messaging component for sending messages between users of the system, and a posting component for posting data items. The method also includes creating a data receiver, referred to herein as a "matter," organizing the status data, messages and postings by activity within a matter, wherein data is received within each matter and is displayed. The data corresponds to a patent application or other legal matter handled by a user of the case management system. The method includes rendering data stored in one or both of the case management systems, available to users accessing matters in each of the case management systems.

A message is sent from one of the case management systems to the other case management system. The message includes a tag identifying the matter and, optionally, any activity to which the message relates. The message is received at the second case management system directing the message to an associated matter in the second case management system. A user in the second case management system receives the message and associates the message with a corresponding one of the activities of the matter. Any further messages received from the first case management activity are automatically associated with the corresponding activity.

One other method embodiment includes sending an update data packet from one case management system to another case management system. The data from the data packet is used to either automatically update status data, or to update status data after manual approval.

DETAILED DESCRIPTION

The method of the present invention synchronizes information in two or more case management systems. The case management systems are, for some embodiments, web-enabled and for other embodiments, network-based. Any case management system with e-mail sending and receiving capability is usable in the method of the present invention. For some embodiments, the case management systems are collaborative enterprise management platforms (EMP's) for managing patent and trademark matters. Each EMP includes a system for storage of matters, such as is described in a provisional patent application entitled, "Internet-Based Patent and Trademark Application Management System," filed Mar. 29, 2001, which is herein incorporated by reference. In particular, the EMP includes activities associated with each matter. Other applications incorporated by reference herein include "Internet-Based Patent and Trademark Application Management System," filed Jun. 1, 2001 with Ser. No. 09/872,701; "System and Methods for Managing Information Disclosure Statement References," filed Mar. 1, 2002, and having Ser. No. 10/087,561; and "Methods, Systems, and E-Mails to Matters and Organizations," filed Apr. 23, 2002.

The method includes using data, or messaging, or posting features within the case management systems in order to relate matters within each of the systems to each other and to populate the matters with data so that the data in the two or more synchronous matters are substantially identical.

In one embodiment, two or more case management systems include components of data storage, for storing status data, such as is shown at 12 in FIG. 1, and a messaging component such as is shown at 14 in FIG. 1. The messaging component permits messages to be sent between and among users of the case management system. The case management system also includes a posting component 16 for posting data items. Each of the case management systems includes many matters with each matter including the data storage component, the messaging component and the posting component.

The term "matter" as used herein refers to a particular type of data organization peculiar to legal practice. The matter organizes data in terms of status data, messages and posting activity pertinent to the matter. One type of matter is a patent application matter. The status data for a patent application matter includes information such as the serial number, title, filing date, inventors and so forth. Postings within a patent application matter include correspondence received from the United States Patent Office, such as office actions. Postings also include correspondence sent to the United States Patent Office such as amendments and responses. While the United States Patent Office is described herein, it is understood that applications and other types of filings from other patent offices around the world are included as matters, as well as actions conducted before other types of government offices and court systems.

Synchronization using the method of the present invention is employed in situations where, in one example, a Law Firm A begins using an electronic case management system having the components described herein within its own law firm operation. Attorneys of the Law Firm A are users of the case management system. The system is hosted on the law firm's own server. The system is collaborative in that designated individuals can view and enter postings and messages and data. The designated users access the system through an extranet. Each user has a verifiable user name and password. The clients of the Law Firm A are parties to the matters on the law firm's local case management server.

In one scenario, at least one of the corporate clients, Corporation B, of the law firm decides to obtain its own copy of the case management software and to host it on its own corporate in-house server. The Corporation B populates its own server with matters it originally had placed on the law firm server as well as matters handled by other law firms. Once this task is completed, substantially the same matters are hosted on both the Law Firm A server and the Corporation B server. Each matter contains substantially the same data.

The problem that both the law firm and the corporation now have is how to synchronize data added to matters that both the law firm software and the corporation software have in common. In particular, the Law Firm A must synchronize information added to the law firm's case management system for matters shared with the Corporation B. The Corporation B must synchronize information added by the corporation to Corporation B's case management system to the matters shared with the law firm.

In one embodiment of the present invention, data in the two case management software systems are synchronized when one of the case management systems in which a matter change has occurred sends a message to the other case management system. In one embodiment, a user of one system sends a message to himself or herself, as user in the second case management system. The message includes an identification of the matter in which information has been changed and, if appropriate, the activity in which information has been changed. The message also includes the information which has either been added to the matter or changed within the matter or deleted from the matter. In one embodiment, a user of the second case management system receives the message and associates it with the corresponding matter and activity within the matter. The user makes the data change, data addition or data deletion in the corresponding matter of the second case management system.

In another embodiment, the matters within the two case management systems are automatically related by a matter identification number. In this instance, data within each of the matters is periodically, automatically compared. The data in each matter are compared to each other and are compared to a previous record of data in both matters at the time of synchronization. The matters are automatically synchronized by adding data, postings or documents or messages which have been added to one case management system matter to the second matter, changing data and for some embodiments, deleting data.

In another embodiment, postings are synchronized instead of messages. In particular, postings which have been added to one matter of the first case management system are added to the corresponding matter of the second case management system at the time of synchronization.

In another embodiment, matters are synchronized by associating the matters with user IDs that are common for both the first case management system and the second case management system. This type of synchronization allows users to be correlated between the systems. As a consequence of this type of synchronization, the user of the first case management system views the same information in both the first and second case management systems.

For some embodiments, a posting which is made on the first case management system for a particular matter is sent to the user on the second system to approve the posting on the comparable matter in the second system. The user is the same for both case management systems.

In another synchronizing embodiment, an "update data packet" is sent from one case management system to a second case management system, and in particular, from one matter within the first case management system to a corresponding matter in the second case management system. The data from the packet is used to either automatically update status data or update it after manual approval. This type of synchronization requires mapping in order to relate the same fields in each system.

The data packets are usable to set up a new matter on the second system which has been set up on the first case management system. For instance, the first case management system has a new matter opened, such as a patent application matter. The users of the first system, such as the company, send the law firm case management system, the second system, an updated data packet with the application data that the company entered. The law firm enters this data on the second case status system, which in turn is used to automatically populate data fields of a new corresponding matter in the law firm case management system.

In another embodiment, a message is sent from a matter created in the first case management system, specifically within the activity of the matter of the first system, but has no matter specified for the second system. For this synchronization embodiment, the message is received by the second case management system as a general delivery message, in one embodiment, by a pre-associated user or simply the administrator of the second case management system, and then the message is associated with the matter in the second case management system and a notice is sent back to the first system. In another embodiment, a reply is sent back. From that point on, the notice is used to tell the first case management system which second system matter to relate the messages from the first system. This is referred to as "on the fly" synchronization.

Some case management systems include a component that permits storage of prior art documents for use in IDS statements required by the United States Patent and Trademark Office. These types of case management systems can be synchronized by sending prior art documents from one system to the second case management system in the same manner as messages are relayed as described herein. The matters are related from one system to another in order to allow prior art to be automatically synchronized with one or more matters in one or more case management systems. While two case management systems have been described herein, it is understood that multiple case management systems can be synchronized with each other. This type of case management system synchronization is based upon a peer-to-peer synchronization.

In another embodiment, information changes in case management matters are synchronized to a master system that receives information changes within matters over designated time intervals. The master system then transmits the information changes to case management systems that are ignorant of each other.

It will be appreciated by those skilled in the art that changes could be made to the embodiments described above without departing from the broad inventive concept. It is understood, therefore, that this invention is not limited and is intended to cover modifications within the spirit and scope of the present invention, as defined by the appended claims. Thus, the invention should be determined by the appended claims, rather than by the examples given.

What is claimed is:

1. A method, comprising:
    providing at least first and second legal case management systems, each legal system including a data storage component for storing status data about legal matters, a messaging component for sending messages between users of the system, a posting component for posting data items;
    organizing the status data, messages and postings by activity within one of said legal matters, handled by a user of the system;
    using data stored in one or both of the legal case management systems, with the legal matters in each of the legal case management systems;
    sending a message from the first legal case management system to the second legal case management system, the message including an indication of the legal matter and any activity to which the message relates;
    receiving the message at the second legal case management system, the second legal case management system directing the message to the associated matter in the second legal case management system;
    a user of the second legal case management system receiving the message and associating it with a corresponding one of the activities in the legal matter in order to synchronize messages for the first and second legal case management systems;
    presenting the synchronized messages to users of the first and second legal case management systems; and
    using data stored in one or both of the case management systems, associating the user IDs that belong to the same person as between each of the case management systems, thereby allowing users to be correlated between systems;
    wherein any further messages received from the first legal case management activity are automatically associated with the corresponding activity in the second legal case management system.

2. The method of claim 1 wherein related matters and related activities in each of the case management systems are associated.

3. The method of claim 1 wherein postings are synchronized instead of messages.

4. The method of claim 1 wherein the message sent originates from a matter in the first case management system and optionally an activity in the first case management system but has no matter specified in the second case management system wherein the message is received at the second case management system as a general delivery message and then is associated with a matter in the second case management system and wherein notice is sent back to the first case management system in the form of a notice or a reply to the message which from that point on tells the first case management system which second system matter to relate messages from the first system to.

5. The method of claim 1 wherein prior art documents are sent instead of messages.

6. The method of claim 1 wherein the first case management system sends a message or a posting or a prior art document to a master system that acquires data and then passes it along to other case management systems having related matters.

7. A method, comprising:
    providing a first and a second legal case management systems, each legal system including a data storage component for storing status data about legal matters, a messaging component for sending messages between users of the system, a posting component for posting data items;
    organizing the status data, messages and postings by activity within one of the legal matters handled by a user of the system;
    using data stored in one or both of the legal case management systems, with legal matters in each of the legal case management systems;
    sending a message from a matter in the first legal case management systems to the second legal case management system, the message including an indication of the legal matter and any activity to which the message relates, the second legal case management system having no corresponding matter specified in the second legal case management system;
    receiving the message at the second legal case management system as a general delivery message, the second legal case management system associating the message to a matter in the second legal case management system and sending a notice back to the first case management system in the form of a notice or a reply to the message which from that point on tells the first case management system which second system matter to relate messages from the first system to;
    a user of the second legal case management system receiving the subsequent message and associating it with a corresponding one of the activities in the legal matter in order to synchronize messages for the first and second legal case management systems;
    presenting the synchronized messages to users of the first and second legal case management systems; and
    using data stored in one or both of the case management systems, associating the user IDs that belong to the same person as between each of the case management systems, thereby allowing users to be correlated between systems;
    wherein any further messages received from the first legal case management activity are automatically associated with the corresponding activity in the second legal case management system.

8. The method of claim 7, wherein sending a message further comprises sending a message from an activity in the first legal case management system.

* * * * *